Dec. 12, 1961  E. R. REESE  3,012,901
METHOD AND APPARATUS FOR ORIENTING PARTICLES
Filed Feb. 7, 1956  2 Sheets-Sheet 1

INVENTOR
ELLSWORTH R. REESE by

ATTORNEY

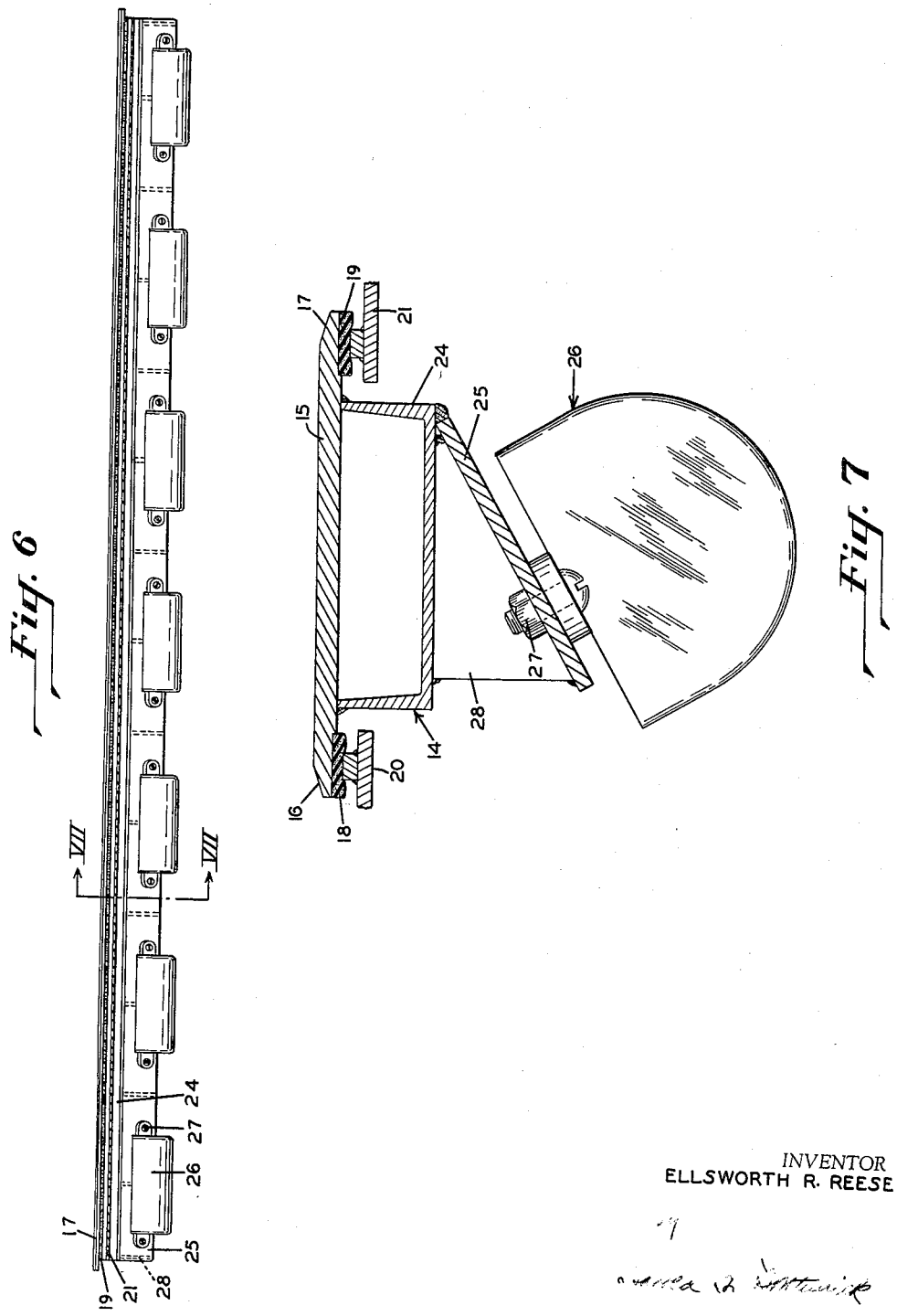

United States Patent Office

3,012,901
Patented Dec. 12, 1961

3,012,901
METHOD AND APPARATUS FOR ORIENTING PARTICLES
Ellsworth R. Reese, Lancaster, Pa., assignor to Armstrong Cork Company, Lancaster, Pa., a corporation of Pennsylvania
Filed Feb. 7, 1956, Ser. No. 563,963
5 Claims. (Cl. 117—21)

This invention relates to a method and apparatus for orienting particles and is directed more particularly to a method and apparatus for orienting a mixture of relatively flat flakes and granulated particles in the manufacture of a surface covering. As a typical embodiment of the invention, there has been illustrated in the drawings and will be described in this specification a plastic product made to simulate stone terrazzo flooring.

In the construction of a terrazzo floor, small pieces of stone of various colors or shades of the same color are mixed with Portland cement or similar bonding material, and a layer of this mix is screeded to a desired thickness over a suitable base. After the cement has hardened, the upper surface of the mass is abraded, preferably with rotating grinding stones, and then the surface is polished. There results a floor having a smooth upper surface in which the variously colored stone particles constitute a major portion of the exposed area. Each of the stone particles is surrounded by a bonding layer of cement, and the particles are of irregular outline but have a flat, polished upper surface.

In modern architectural styles, there is a great demand for a floor covering in a simulation of terrazzo but of a more resilient and colorful character. It is not economically practicable to build a resilient floor of this type following the usual practice in constructing a terrazzo floor, using pieces of resilient material, such as vinyl chloride, rubber, or similar plastic materials, in place of the stone particles. The grinding and polishing of plastic materials is difficult and expensive, and the surface produced is not as smooth as that obtained by grinding and polishing hard materials like stone. It is not feasible to obtain the desired surface smoothness and at the same time simulate the polished stone appearance of terrazzo by forming a layer of the particles of plastic material on a backing of fabric or felt such as used in the manufacture of linoleum and other floor coverings and then applying heat and pressure to the layer with a polished pressing surface, particularly where the thickness of the layer is small, as it must be because of the high cost of the plastic material.

A very attractive surface covering having the appearance of stone terrazzo can be produced, however, if relatively flat pieces or flakes of the plastic material are used and are combined with smaller granulated particles which serve to join the flat pieces together and simulate the Portland cement matrix of the stone terrazzo floor, provided the flat flakes are oriented properly at the surface of the finished product. Such a surface covering can be produced by hand methods with the flakes being distributed over the surface of a leveled mass of plastic material, but such a process does not lend itself to mass production methods.

One of the objects of this invention is to provide a method for automatically orienting thin flakes contained in a mass which also includes granulated particles to obtain a substantially uniform distribution of the flakes at the surface of the mass and to so position the flakes that those at the surface are disposed with their flat surfaces lying substantially parallel to the upper surface.

Another object of the invention is to provide an apparatus by which a mass of flakes of material and granulated particles of material deposited as a thin layer on a suitable supporting foundation may be operated upon to effect migration of the granulated particles away from the surface, leaving the flakes disposed principally in the upper surface and to orient such flakes with their flat faces substantially parallel to the upper surface of the layer.

Other objects of the invention will be obvious from consideration of the following detailed description of an embodiment of the invention which will be described in conjunction with the attached drawings in which:

FIGURE 6 is a front elevational view of a portion of the apparatus, partially in section, illustrating the orienting mechanism in its operative position; and FIGURE 7 is a sectional view taken along the line 7—7 of FIGURE 6.

According to the method of the invention, a layer of loose particles of material made up of thin, flat flakes of irregular shape and granulated particles of a generally smaller size is positioned upon a supporting foundation such as a sheet of waterproof felt commonly used in the manufacture of linoleum and similar plastic floor coverings. The foundation with the applied layer of plastic material thereon is moved over and in contact with a vibrating table. Vibration is imparted to the layer through the foundation felt, and this vibration is effective for orienting the flat flakes to positions substantially parallel to the surface of the foundation. It also causes many of the flakes to be disposed in the upper surface portion of the layer, due to migration of the smaller, irregularly shaped, granulated particles toward the foundation. The mass in this condition is then delivered to a suitable consolidation press or the like where pressure is applied, with heat in most instances, and the mass is formed into a smooth surfaced product, the exposed surface of which consists principally of the flakes which are joined to one another and to the foundation by the granulated particles.

The apparatus of the invention consists principally of an arrangement for forming on a supporting foundation a layer of substantially uniform thickness made up of flakes and granulated particles, a unit for orienting the flakes in the layer applied to the foundation comprising essentially a resiliently mounted plate and one or more vibrators mechanically attached to the plate and effective for imparting a vibratory motion thereto, and a press or the like for consolidating the mass of oriented particles.

Figure 1:
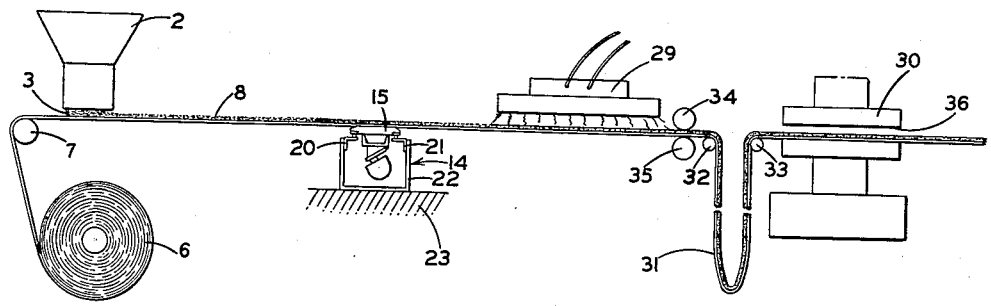
FIGURE 1 is a diagrammatic view illustrating the method and apparatus of the invention.
Figure 2:
FIGURE 2 is a top plan view of mass of flakes and particles of the type under consideration.

The method and apparatus will be described specifically in conjunction with the attached drawings. Referring first to FIGURE 1, there is shown a hopper 2 which contains a mass of material 3 made up of flat flakes 4, as shown in FIGURE 2, and granulated particles 5 of irregular shape and size as there shown. The size and shape of the particles and the flakes may be varied over wide limits. In a typical mix, the flat pieces may be formed as sheets about .015" thick by a calendering operation. There may be one or more different colored sheets employed. The sheets may be severed into pieces and delivered to a chipper such as a Fitz mill having a ½" screen. The Fitz mill tears the sheet into pieces which may be about ½" in maximum dimension. The size of the pieces is determined by the screen which is used in the Fitz mill. Some of the flakes will be larger than ½", and many of course will be smaller than ½". The flat sheets may be monocolored or they may be striated or grained, or a mixture of plain and striated colored flakes may be used. For example, a pattern may be made up of a pink and white jaspé graining, flakes of plain black and plain white, together with grey and white jaspé grained flakes.

The granulated particles may be formed of the same composition as the flakes and may be of the same color as one or more of the flake colors or may be entirely different. Frequently in stone terrazzo floors, the matrix color is different from any of the stone colors. These granules may be formed by first sheeting the material to about ⅛" in a calendering operation and then pulverizing the sheets in a Fitz mill or a hammermill type disintegrating unit and screening out the particles of the desired size, regrinding those that are too large and resheeting those that are too small. Granulated particles which will pass through a six mesh screen and be retained on a fifty mesh screen will be satisfactory. In other words, a 6–50 mesh U.S. Standard size range is an example of a typical size for the granulated particles. The mass may consist of the following proportions all parts being by weight.

Flakes: Parts
  Pink and white jaspé _____ 1
  White _____ 1
  Black _____ 1
  Grey and white jaspé_____ 1
Granules:
  Light grey_____ 6
  Dark grey_____ 6
  Medium grey_____ 6

A roll of foundation material 6 which may be asphalt saturated felt, a tall oil saturated felt, or a backing fabric of any desired sort, is delivered over a roll 7, below the hopper 2. The hopper 2 may be provided with a blade at the forward edge effective for leveling the mix deposited upon the foundation 6 to a layer 8 about .100" thick.

Figure 3:
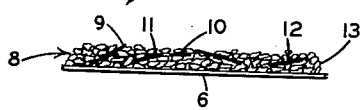
FIGURE 3 is a diagrammatic side elevational view illustrating a mass of the particles of FIGURE 2 disposed upon a supporting backing or foundation prior to orientation of the flakes.

As noted in FIGURE 3, some of the flakes 9 will be disposed essentially on edge, while others 10 will lie substantially flat but below the upper surface of the layer. Others will be in various positions, as indicated at 11 and 12. The granules 13 will be randomly interspersed throughout the thickness of the layer 8.

The foundation 6 with the applied layer 8 is carried over a vibrating table generally indicated by the numeral 14 in FIGURE 1. This table is shown in more detail in FIGURES 6 and 7. It comprises a metal plate 15 which may be about ½" thick and, in the embodiment illustrated, is about 8" wide. It is provided with an inclined leading edge 16 and an inclined trailing edge 17. The length of the table will depend upon the width of the foundation sheet 6. In the manufacture of a floor covering six feet wide, the table may be about 96" in length. The plate 15 is positioned on resilient pads 18 and 19 which may be made of sponge rubber, for example. Supporting angles 20 and 21 (FIGURE 1) are secured to a box frame 22 which is positioned on the foundation for the machine which has been diagrammatically illustrated at 23 in FIGURE 1.

Welded to the plate 15 is a channel 24 which extends along the length of the plate 15, as shown in FIGURE 6. An inclined mounting plate 25 is provided for vibrating units 26 which are secured thereto by mounting bolts 27. The mounting plate 25 is welded to the channel 24 and is supported at spaced intervals by attaching plates 28 which are welded to the channel 24 and to the mounting plate 25, as shown in FIGURE 7. By this boxlike construction with the channel 24 and plate 15 secured together and with the vibrators securely fastened to the mounting plate 25 which is in turn rigidly secured to the channel 24, the motion of the vibrators 26 is effectively transmitted to the plate 15.

There are preferably a plurality of the vibrating units 26 mounted on the plate 25. In the embodiment shown in FIGURE 6, there are seven such units which are positioned equidistantly along the length of the unit. Any suitable vibrator may be used. A satisfactory unit is one manufactured by Syntron Company, of Homer City, Pennsylvania, and known as its model V–15. This model produces 3600 vibrations per minute with an input of 75 watts at 3 amperes, 110 volts 60 cycles. Each vibrator weighs about 12½ pounds. The speed of vibration and the amplitude of vibration may be varied for different types of materials being operated upon.

With the vibrators mounted on the plate 15 as shown and the plate 15 "floating" on the resilient pads 18 and 19, a good vibratory motion is imparted to the plate 15 upon energization of the vibrators. With the foundation 6 carrying a .100" thick layer 8 of material to be oriented and moving over the table at a rate of 10' per minute, the vibrators operating at 3600 cycles, a very effective orientation of the flakes and particles is obtained.

Figure 4:
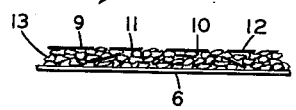
FIGURE 4 is a view similar to FIGURE 3 showing the particles after orientation of the flakes has been effected.

The orientation obtained has been shown diagrammatically in FIGURE 4 where the flat flakes 9–12 have been disposed in the upper surface of the layer and lie substantially parallel with the upper surface. The granules 13 are interspersed with the flat particles, and the the thickness of the layer is substantially uniform throughout—this is another function of the vibrating unit—so that, upon consolidation of the mass, a product of essentially uniform density is produced.

Referring to FIGURE 1, after proper orientation of the flakes and particles has been accomplished, the backing layer 6 with its applied layer of plastic composition may be delivered under a radiant heater unit 29 which serves to prepare the particles for final consolidation in a press diagrammatically illustrated at 30. Where a flatbed press is used, as diagrammatically shown in FIGURE 1, and its operation is intermittent, it is necessary to provide a dip or loop 31 in the material between rolls 32 and 33 to permit continuous movement of the backing 6 over the vibrating table and under the radiant heater. Consolidating rolls 34 and 35 may be provided to press the particles and flakes together and to the foundation adequately to permit the material to travel through the dip 31. It is, of course, possible to feed the backing intermittently. Preferred practice, however, is to feed the material onto the backing in a continuous manner, vibrate it to effect proper orientation, and then consolidate intermittently with the heated flatbed press 30. The platens 36 of the press may be steam heated; and, if necessary, a release paper may be positioned between the press platen and the upper surface of the material to be consolidated. The paper will, of course, be stripped from the surface after completion of the consolidating operation.

The particles and flakes may be formed of any desired material, for the invention is not concerned with the material employed. A vinyl type surface covering may be produced from flakes and chips of plasticized polyvinyl chloride or a vinyl chloride-vinyl acetate copolymerization product. Combinations of polyvinyl chloride and synthetic rubber, rubber, linoleum, flakes of cork, and mixtures of various sorts may be used. The nature of the material employed is not critical. The invention is concerned principally with a method and apparatus, and both are applicable to all sorts of compositions.

Where a vinyl chloride mass is used, the composition of the flakes and particles may be as follows:

Parts by weight
Plasticized polyvinyl chloride_____ 100
Mineral filler_____ 650
Pigment _____ 25

Figure 5:
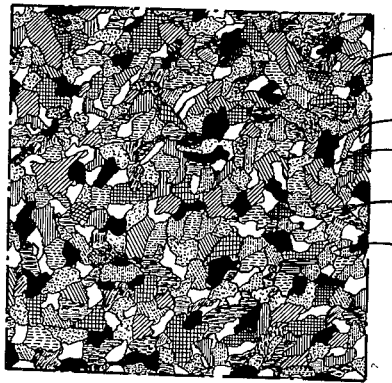
FIGURE 5 is a top plan view of a portion of a completed piece of surface covering material produced in accordance with the invention.

A piece of the finished product is shown in FIGURE 5. It will be noted that the flakes 9–12 are disposed flatwise in the finished product and a good simulation of stone terrazzo is obtained. The surface will be smooth and free of any irregularities where the flakes and particles join, the heat and pressure consolidation effecting the creation of an essentially homogeneous product.

I claim:

1. In a method of forming a surface covering, the steps comprising forming upon a foundation a loose dry layer made up of flakes and granules, with some of said flakes being randomly interspersed within the body of said layer, vibrating the foundation and layer thereon to effect migration of said granules toward said foundation and to cause some of said flakes to be disposed at the upper surface of said layer and to be oriented with their flat faces generally parallel to the upper surface of said layer, and consolidating said layer onto said foundation by the application of heat and pressure thereto.

2. In a method of forming a surface covering, the steps comprising forming upon a foundation a loose dry layer of substantially uniform thickness made up of thin flakes and granules of a thermoplastic nature, with some of said flakes being randomly interspersed within the body of said layer, vibrating the foundation and layer thereon to effect migration of said granules toward said foundation and to cause some of said flakes to be disposed as the upper surface of said layer and to be oriented with their flat faces generally parallel to the upper surface of said layer, and consolidating said layer into an essentially homogeneous body secured to said foundation by applying heat and pressure to said layer on said foundation.

3. In a method of forming a surface covering, the steps comprising continuously moving a web of foundation material along a path of travel, forming upon said foundation at one station along said path of travel a loose dry layer of substantially uniform thickness made up of thin flakes, less than the thickness of the layer, and granules of a thermoplastic nature, with some of said flakes being randomly interspersed within the body of said layer, rapidly vibrating said foundation and layer thereon at another station along said path of travel to effect migration of said granules toward said foundation and to cause some of said flakes to be disposed at the upper surface of said layer and to be oriented with their flat faces generally parallel to the upper surface of said layer, and consolidating said loose, oriented layer into a homogeneous layer onto said foundation web by the application of heat and pressure.

4. In an apparatus for orienting particles disposed as a loose dry layer of substantially uniform thickness and made up of thin flakes and granules deposited upon a web, the combination of a vibrating table comprising a flat plate, a rigid channel rigidly fixed to said plate, a mounting plate secured at an acute angle to said channel by a plurality of supports rigidly connecting said mounting plate and said channel, and vibration imparting means secured to said inclined mounting plate for vibrating said table; and means for moving said layer to be oriented over and in contact with said vibrating table.

5. In a method of forming a surface covering, the steps comprising forming upon a flexible foundation web a loose dry layer made up of a matrix of granules having flakes randomly interspersed within said layer, continuously moving said foundation web carrying said loose layer over and in contact with a rapidly vibrating rigid support and thereby imparting a vibratory motion to said foundation web substantially uniformly along the width thereof as the foundation web moves over and in contact with said support to effect migration of said granules toward said foundation and to cause some at least of said flakes to be disposed at the upper surface of said layer and to be oriented with their flat faces generally parallel to the upper surface of said loose layer, and after orientation of the flakes consolidating said layer onto said foundation by the application of heat and pressure thereto.

References Cited in the file of this patent

UNITED STATES PATENTS

| | | |
|---|---|---|
| 1,001,836 | Fritz | Aug. 29, 1911 |
| 1,176,609 | Scott | Mar. 21, 1916 |
| 1,437,872 | Tamberlin | Dec. 5, 1922 |
| 1,619,734 | Jeppson | Mar. 1, 1927 |
| 1,857,340 | Wyatt | May 10, 1932 |
| 1,975,515 | Mayer | Oct. 2, 1934 |
| 2,468,472 | Townsend | Apr. 26, 1949 |
| 2,548,029 | Kurtz | Apr. 10, 1951 |
| 2,655,895 | Abeles | Oct. 20, 1953 |

OTHER REFERENCES

Taggert: "Handbook of Mineral Dressing," John Wiley & Sons, N.Y., 1945, pages 11–01, 11–04.